US006682683B2

(12) United States Patent
Michaelis et al.

(10) Patent No.: US 6,682,683 B2
(45) Date of Patent: *Jan. 27, 2004

(54) METHOD FOR MANUFACTURING AN ACCORDION FILTER INSERT

(75) Inventors: Udo Michaelis, Weiterstadt (DE); Dieter Linse, Schwetzingen (DE); Jörgen Knudsen, Angelbachtal (DE)

(73) Assignee: Firma Carl Freudenberg, Weinheim (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 192 days.

(21) Appl. No.: 08/753,230

(22) Filed: Nov. 22, 1996

(65) Prior Publication Data

US 2003/0070405 A1 Apr. 17, 2003

(30) Foreign Application Priority Data

Dec. 22, 1995 (DE) .......................................... 195 48 197

(51) Int. Cl.⁷ ............................................... B29C 45/14
(52) U.S. Cl. ................. 264/275; 264/279; 264/DIG. 48
(58) Field of Search .............................. 264/279, 279.1, 264/DIG. 48, 275; 55/497, 521, 502, DIG. 5, DIG. 31; 277/212 R, 212 F

(56) References Cited

U.S. PATENT DOCUMENTS

| 2,889,183 A | * | 6/1959 | Peras ...................... 277/212 R |
| 3,082,587 A | * | 3/1963 | Brimberg ............. 264/DIG. 48 |
| 3,397,518 A | * | 8/1968 | Rogers .......................... 55/497 |
| 3,869,392 A | * | 3/1975 | Wolf ............................. 55/502 |
| 4,976,857 A | * | 12/1990 | Solomon ............. 264/DIG. 48 |
| 5,792,229 A | * | 8/1998 | Sassa et al. ................... 55/497 |

FOREIGN PATENT DOCUMENTS

| GB | 1404631 | | 9/1975 | |
| JP | 406007621 | * | 1/1994 | .................. 55/497 |

* cited by examiner

Primary Examiner—Edmund H. Lee
(74) Attorney, Agent, or Firm—Kenyon & Kenyon

(57) ABSTRACT

A method for manufacturing an accordion filter insert in which an accordion filter pack is introduced into a mold and a space remaining thereafter in the mold is filled with a liquefied polymer material so as to form a frame surrounding the accordion filter pack. At least one peripheral elastically deformable sealing lip, consisting of the material of the frame, is produced together with the frame and is consolidated concurrently therewith.

9 Claims, 2 Drawing Sheets

METHOD FOR MANUFACTURING AN ACCORDION FILTER INSERT

This application claims priority to the German Application No. P19548197.6, filed Dec. 22, 1995 in Federal Republic of Germany.

BACKGROUND OF THE INVENTION

The invention relates to a method for manufacturing an accordion filter insert in which an accordion filter pack is introduced into a mold and a space remaining thereafter in the mold is filled with a liquefied polymer material, which subsequently solidifies in order to provide a frame surrounding the accordion filter.

This method is described in DE 21 66 432 A1, in which the accordion filter insert is configured as a pocket filter. The edge of the filter medium that forms the pocket filter is embedded in the plastic filter frame in such a way that the edge of the filter medium projects out of the frame on all sides as a seal. The filter medium itself consists of a material that is penetrated by plastic as it intersects the frame.

The seal provided by the filter medium protruding from the frame is unsatisfactory in terms of its utilization characteristics. For example, when viewed in the peripheral direction, the seal rests against the filter housing with different levels of preload. Relaxation phenomena can occur in the region of the seal during a long filter insert utilization period, resulting in leakages.

There remains a need to further develop this method such that it can be practiced more simply in terms of production engineering and with greater economy. A further need is that tithe filter insert manufactured by this method have improved utilization characteristics, particularly improved sealing of the frame surrounding the accordion filter pack against the filter housing. The preload of the frame should be of substantially uniform magnitude along its entire periphery, thus resulting in secure, rattle-free fixing of the accordion filter insert in the filter housing during a long utilization period.

SUMMARY OF THE INVENTION

The present invention addresses these needs by providing a method for manufacturing an accordion filter insert, in which the frame is formed about the filter material along with an elasticly deformable sealing lip on the periphery of the frame.

The peripheral elastically deformable sealing lip, which is made of the same material of the frame itself, is produced together with the frame and consolidated concurrently with consolidation of the frame. It is advantageous that the frame and the sealing lip are manufactured simultaneously, in one step, and from a common material. The mold space is equipped with a cavity for formation of the sealing lip, so that the liquefied polymer material simultaneously fills the space for the frame and the cavity for the sealing lip. As a result, the filter insert can be manufactured easily and cost-effectively. When the ready-to-use accordion filter insert is inserted into a housing, the elastically deformable sealing lip rests sealingly against the surface of the housing facing the accordion filter insert. The sealing lip sealingly contacts arks the housing under elastic preload, which assures a secure, rattle-free fixing of the accordion filter insert in the housing.

Polypropylene, acrylonitrile-butadiene-styrene, and/or polyester can be used to produce the frame and the sealing lip. An advantage of polypropylene for use in the frame and the sealing lip is that this material is viscoplastic. Consequently, damage to the frame and/or to the sealing lip (e.g., due to breakage) is reliably prevented, even during a long service life. Moreover, the use of polypropylene is particularly economically advantageous to use for fabrication of the accordion filter insert. Acrylonitrile-butadiene-styrene is also available at low cost, and has very low distortion.

Another material which can be used is polyester. If polyester is used for the frame and the seal, the entire accordion filter insert can be made of this material, and the accordion filter pack, the frame, and the seal (all consisting of polyester) can therefore easily be recycled after use.

The invention also provides an accordion filter insert obtained according to the method described above. The accordion filter insert of the invention is intended to have improved utilization characteristics, in particular improved sealing of the frame against the housing. The preload of the sealing lip against the housing is substantially uniform in the peripheral direction so as to ensure not only secure sealing but also rattle-free location of the frame with respect to the housing.

The sealing lip preferably is configured in the form of a membrane (i.e., being relatively thin and flexible). A sealing lip of this kind adapts particularly well to the contours of the adjacent housing surface, thereby providing uniform contact pressure against the housing along the entire periphery of the accordion filter insert.

The sealing lip can have a symmetrical, wedge-shaped profile, such that elastic contact pressure rises progressively with increasing deformation of the sealing lip during installation into the housing. A profile of this kind causes the accordion filter insert to center itself automatically inside the housing, in such a way that the contact pressure at the surface of the housing is of uniform magnitude in all regions.

The sealing lip can have a cross section that is diminished in its root region (i.e., the junction of the lip with the frame), the root region being configured in the manner of a film hinge. An advantage of a configuration of this kind is that it enhances the flexibility of the sealing lip, even as it reduces the risk of breakage in the root region.

The frame and the sealing lip are configured integrally and continuously with one another of a uniform material. A filter insert of this kind can thus be manufactured simply and in economically cost-effective fashion in terms of production engineering. Also advantageous is the fact that when acted coupon by heat, the frame and the sealing lip have uniform characteristics with respect to thermal expansion. Internal stresses that might lead to damage and/or material fatigue are thereby prevented.

According to one advantageous embodiment, the sealing lip of the new, uninstalled filter insert (i.e., in its as—manufactured state) defines an acute angle with respect to the air inflow direction. As manufactured, the side surfaces of the sealing lip delimiting the angle, and the direction of the air being purified, enclose an angle of 20 to 89 degrees. The angle is less after installation, due to the fact that the sealing lip sealingly contacts the housing under elastic preload. Preferably, the magnitude of the angle is 50 to 75 degrees as manufactured. It is advantageous in this connection that as the pressure difference between the incident flow and outlet flow sides of the accordion filter insert increases, the contact pressure of the sealing lip against the housing also increases. Because the contact pressure of the sealing lip against the housing depends on the differential pressure applied to the accordion filter insert, relaxation phenomena in the polymer material are reduced to a minimum.

According to another embodiment, the sealing lip of the new, uninstalled accordion filter insert can, as manufactured, delimit a right angle with respect to the air inflow direction. One advantage of this structure is that it is possible to install the accordion filter insert into the housing in any desired direction. It is only during installation of the accordion filter insert into the housing that the sealing lip comes into contact against the housing (under elastic preload) in such a way that it encloses an acute angle with the direction from which the air being purified flows in. In the case of an accordion filter insert configured in this fashion, the sealing lip is pressed more strongly against the housing when installed, as the pressure difference between incident flow and outlet flow sides increases. An embodiment of this kind largely eliminates errors in mounting the accordion filter insert into the housing in the direction from which the air flows in.

BRIEF DESCRIPTION OF THE DRAWINGS

The method, and the accordion filter insert manufactured according to the method, will be explained in more detail below with reference to the drawings, in which.

DETAILED DESCRIPTION

Figure 1:
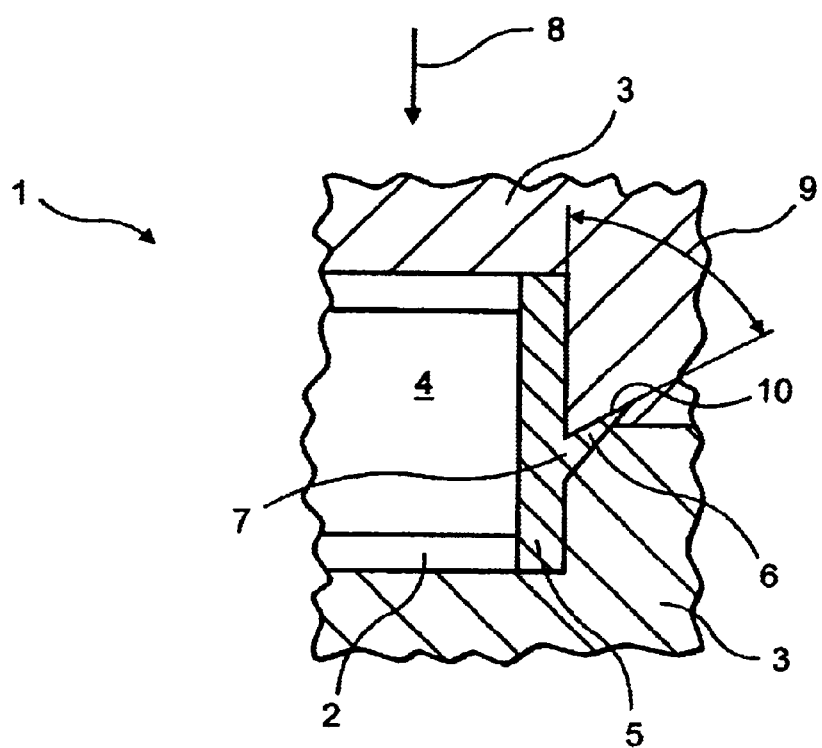
FIG. 1 is a cross-sectional view of a first embodiment of the accordion filter pack, having a frame and wedge-shaped sealing lip.

In FIG. 1, an accordion filter pack 2 is introduced into a mold 3, the remaining space 4 in the mold 3 being filled with a liquefied polymer material and subsequently consolidated. The material forms frame 5 and the peripheral elastically deformable sealing lip 6. Frame 5 and sealing lip 6 are produced together, and consolidated concurrently with one another, so that frame 5 and sealing lip 6 are configured integrally and continuously with one another of a uniform material. Sealing lip 6 is wedge-shape having a side surface 10.

Figure 2:
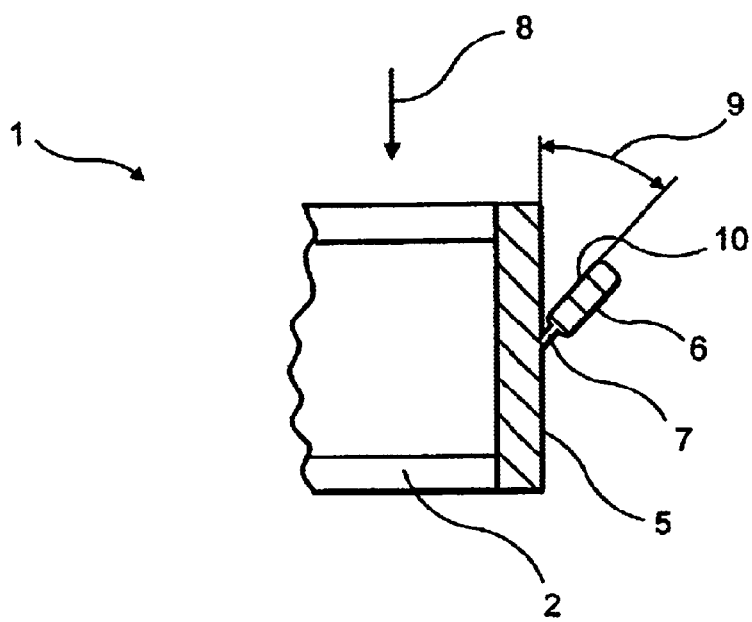
FIG. 2 is a cross-sectional view of a second embodiment of an accordion filter insert constructed according to the principles of the invention, ready for installation.

FIG. 2 illustrates a second embodiment of the accordion filter insert. Here, sealing lip 6 has a cross section, configured in the manner of a film hinge, that is diminished in its root region 7. In this embodiment, angle 9 defined by the sealing lip 6 having a side surface 10 and the direction 8 of the air being purified is 60 degrees as manufactured. After installation, however, the angle is 45 degrees in this embodiment.

Figure 3:
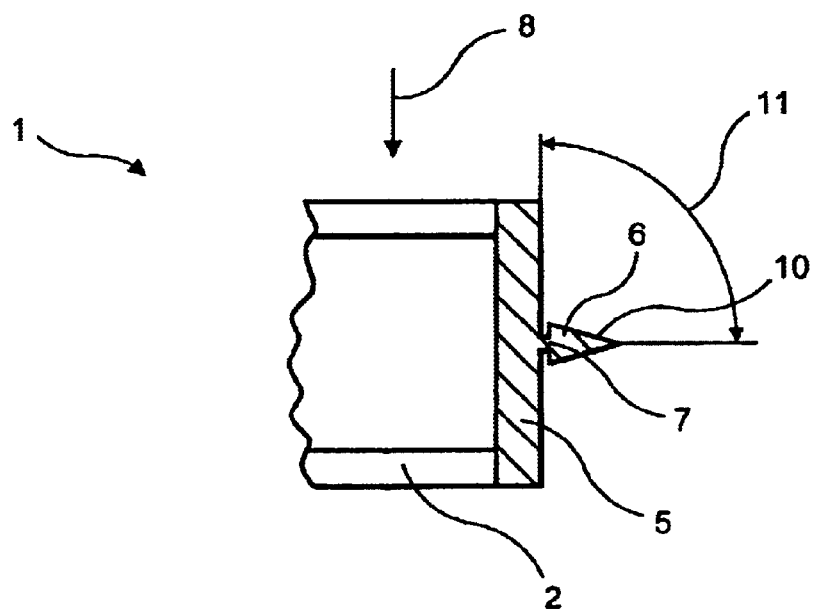
FIG. 3 is a cross-sectional view of a third embodiment of the filter insert constructed according to the principles of the invention, in its manufactured state, in which the wedge-shaped sealing lip is attached to the frame with a root region similar to a film hinge.

FIG. 3 shows a third embodiment, in which the center of the sealing lip 6 and inlet direction 8 delimit a right angle 11. When an accordion filter insert of this kind is installed into a housing, sealing lip 6 encloses an acute angle with respect to air inflow direction 8.

What is claimed is:

1. A method for manufacturing an accordion filter insert comprising:

providing a mold having a cavity that defines a lip;

introducing an accordion filter medium into said mold;

forming a polymer frame surrounding and containing the filter medium by introducing into the mold a liquefied polymer to form a frame about the filter medium, and forming an elastic sealing lip that is unitary with and composed of the same material as the frame and is connected to the frame at a junction;

wherein the sealing lip has a cross section that is reduced near its junction with the frame.

2. The method as defined in claim 1, wherein the liquefied polymer is selected from the group consisting of polypropylene, acrylonitrile-butadiene-styrene, and polyester, and is used to produce the frame and the sealing lip.

3. The method as set forth in claim 1, wherein the sealing lip is formed with a configuration of a membrane, being relatively thin and flexible.

4. The method as set forth in claim 3, wherein the sealing lip is formed so as to have a wedge-shaped profile.

5. The method as set forth in claim 1, wherein the sealing lip is formed so as to have a wedge-shaped profile.

6. The method as set forth in claim 1, wherein the junction between the sealing lip and the frame has a form of a film hinge.

7. A method for manufacturing an accordion filter insert comprising:

providing a mold having a cavity that defines a lip;

introducing an accordion filter medium into said mold;

forming a polymer frame surrounding and containing the filter medium by introducing into the mold a liquefied polymer to form a frame about the filter medium, and forming an elastic sealing lip that is unitary with and composed of the same material as the frame and is connected to the frame at a junction;

wherein the sealing lip has a wedge-shaped profile and the sealing lip has a cross section that is reduced near its junction with the frame.

8. The method according to claim 7, wherein the sealing up of the frame is at an acute angle with respect to the plane of the frame.

9. The method according to one of claim 1 or 7, wherein the sealing lip is set an angel wit respect to the normal of the plane containing the frame of 20 to 89 degrees.

\* \* \* \* \*